(12) United States Patent
Madasamy et al.

(10) Patent No.: US 9,778,944 B1
(45) Date of Patent: Oct. 3, 2017

(54) MANAGED REBOOT OF A MULTI-SERVICE NETWORK DEVICE

(71) Applicant: Juniper Networks, Inc., Sunnyvale, CA (US)

(72) Inventors: Siva Madasamy, San Jose, CA (US); Chirag Wighe, Milpitas, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/940,302

(22) Filed: Nov. 13, 2015

(51) Int. Cl.
*G06F 9/455* (2006.01)
*G06F 9/50* (2006.01)

(52) U.S. Cl.
CPC ........ *G06F 9/45533* (2013.01); *G06F 9/5077* (2013.01)

(58) Field of Classification Search
None
See application file for complete search history.

(56) References Cited

U.S. PATENT DOCUMENTS

| | | | | |
|---|---|---|---|---|
| 6,698,017 B1* | 2/2004 | Adamovits | ............... | G06F 8/67 717/168 |
| 8,799,422 B1* | 8/2014 | Qu | ........................... | G06F 8/67 709/220 |
| 2011/0032830 A1* | 2/2011 | Merwe | .................. | H04L 45/586 370/251 |
| 2012/0102135 A1* | 4/2012 | Srinivasan | .......... | G06F 9/45558 709/213 |
| 2014/0040887 A1* | 2/2014 | Morariu | .............. | G06F 9/44505 718/1 |

OTHER PUBLICATIONS

Cisco, "Cisco Nexus 3000 Series NX-OS Software Upgrade and Downgrade Guide, Release 6.x", http://www.cisco.com/c/en/us/td/docs/switches/datacenter/nexus3000/sw/upgrade/6_x/Cisco_n3k_Upgrade_Downgrade_6x.html#pgfId714131, Sep. 15, 2015, 30 pages.

* cited by examiner

*Primary Examiner* — Lewis A Bullock, Jr.
*Assistant Examiner* — Wynuel Aquino
(74) *Attorney, Agent, or Firm* — Harrity & Harrity, LLP

(57) ABSTRACT

A device may receive an indication to perform a reboot associated with a network service provided via a first virtual machine (VM) of the device and a first container of the device. The device may create a second VM with a boot mode enabled and a second container with the boot mode enabled. The boot mode, while enabled on the second VM, may prevent the second VM from communicating with the first container. The boot mode, while enabled on the second container, may prevent the second container from communicating with the first VM. The device may shut down the first container. The device may disable, after shutting down the first container, the boot mode on the second VM. The device may disable the boot mode on the second container. The device may cause the network service to be provided by the second container and the second VM.

20 Claims, 8 Drawing Sheets

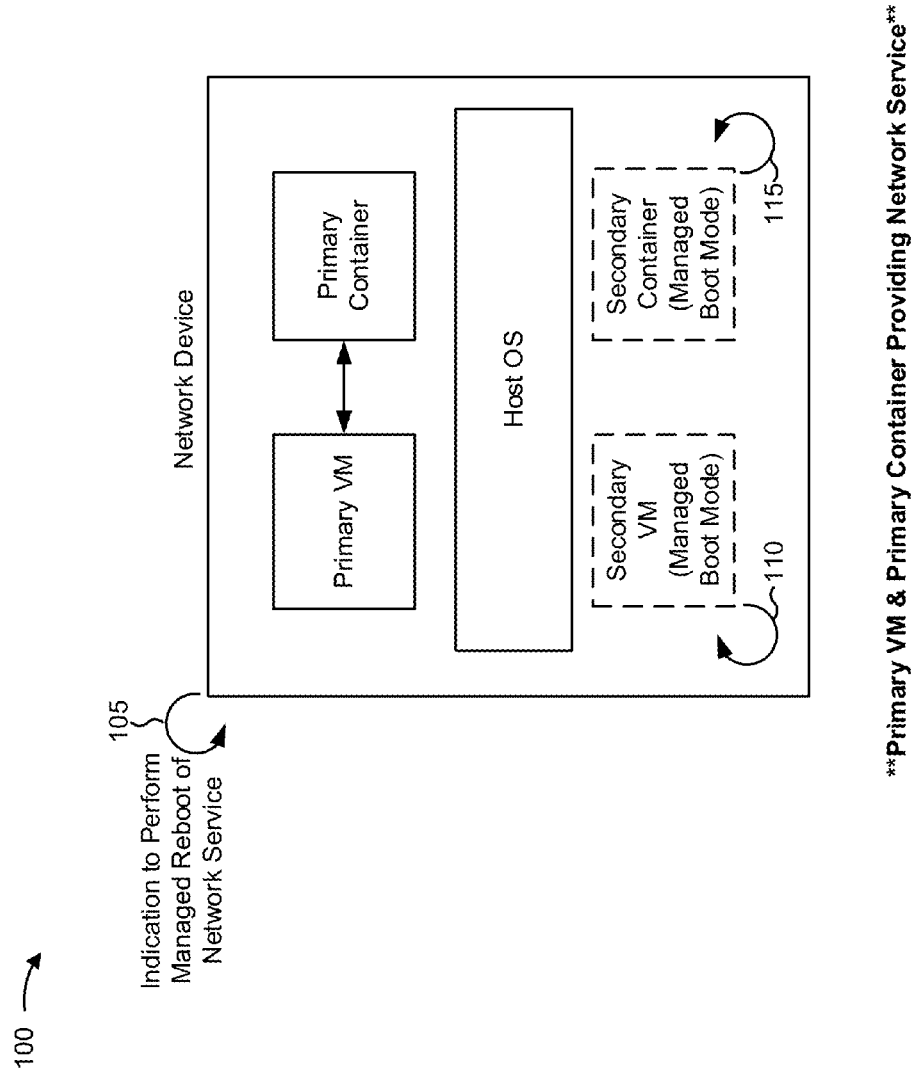

Secondary VM & Secondary Container Providing Network Service

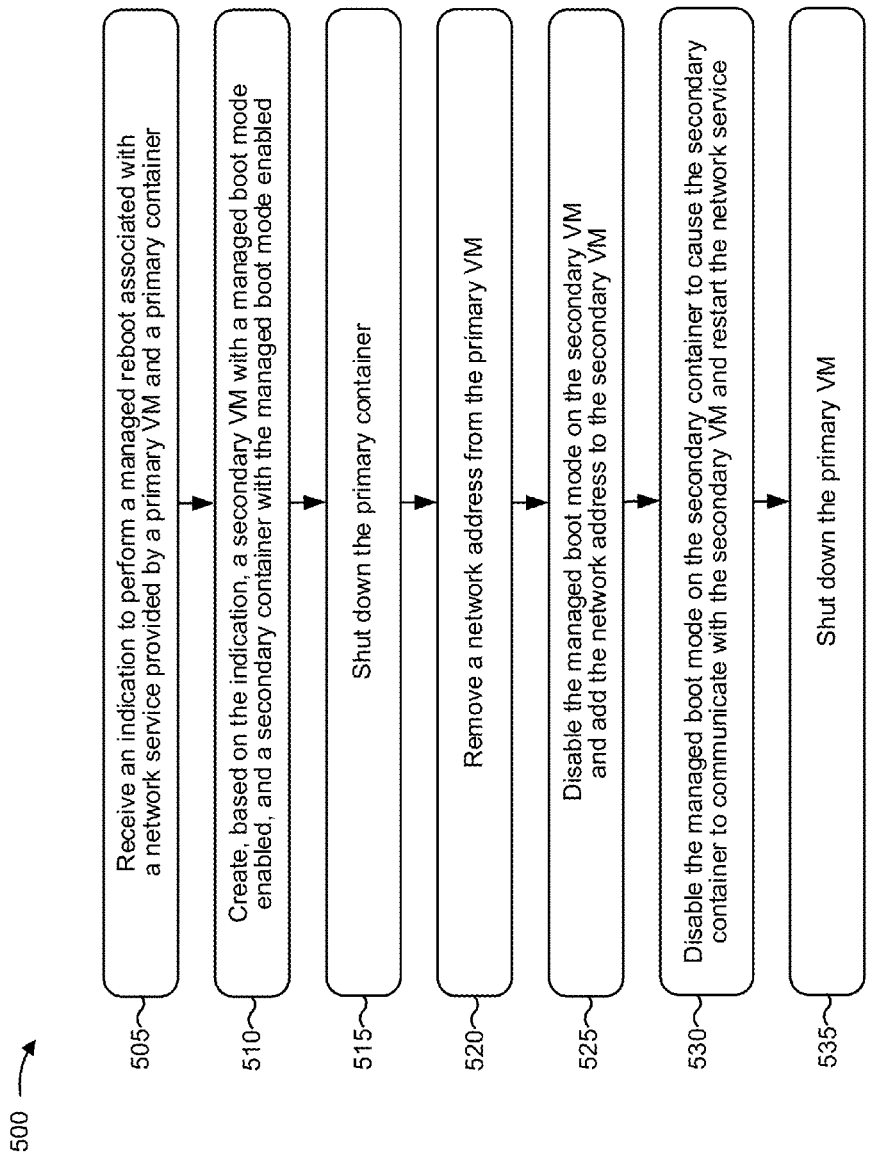

MANAGED REBOOT OF A MULTI-SERVICE NETWORK DEVICE

BACKGROUND

An operating-system-level virtualization method may allow a kernel of an operating system (OS) to provide multiple, isolated user-space instances, which may be referred to as "containers." For example, Linux Containers (LXC) is an operating system-level virtualization method for running multiple isolated Linux systems (i.e., containers) on a host OS.

SUMMARY

According to some possible implementations, a method may include: receiving, by a device, an indication to perform a reboot associated with a network service, the network service may be provided by a first virtual machine (VM) associated with the device and a first container associated with the device; creating, by the device and based on receiving the indication, a second VM with a boot mode enabled and a second container with the boot mode enabled, the boot mode, while enabled, may prevent the second VM and the second container from communicating with the first container and the first VM, respectively; shutting down, by the device, the first container, the first container may be shut down based on creating the second VM and the second container; disabling, by the device and based on shutting down the first container, the boot mode on the second VM; and disabling, by the device and based on disabling the boot mode on the second VM, the boot mode on the second container, the boot mode may be disabled on the second container to cause the network service to be provided by the second container and the second VM.

According to some possible implementations, a network device, may include a processor to: receive an indication to perform a reboot associated with a network service, the network service may be provided via a first virtual machine (VM) of the network device and a first container of the network device; create, based on receiving the indication, a second VM and a second container, the second VM may be created with a boot mode enabled, the boot mode, while enabled on the second VM, may prevent the second VM from communicating with the first container, and the second container may be created with the boot mode enabled, the boot mode, while enabled on the second container, may prevent the second container from communicating with the first VM; shut down the first container based on creating the second VM and the second container; disable, after shutting down the first container, the boot mode on the second VM; disable, after disabling the boot mode on the second VM, the boot mode on the second container; and cause the network service to be provided by the second container and the second VM based on disabling the boot mode on the second VM.

According to some possible implementations, a non-transitory computer-readable medium may store instructions that, when executed by a network device, cause the network device to: receive an indication to perform a reboot associated with a network service, the network service may be provided by a primary virtual machine (VM) of a network device and a primary container of the network device; create, based on receiving the indication, a secondary VM with a managed boot mode enabled and a secondary container with the managed boot mode enabled, the managed boot mode, while enabled on the secondary VM and the secondary container, may prevent the secondary VM and the secondary container from communicating with the primary container and the primary VM; shut down the primary container based on creating the secondary VM and the secondary container; assign, based on shutting down the primary container, a network address of the primary VM to the secondary VM; disable, based on assigning the network address to the secondary VM, the managed boot mode on the secondary VM; and disable, based on assigning the network address to the secondary VM, the managed boot mode on the secondary container, the managed boot mode may be disabled on the secondary container to cause the network service to be provided by the secondary container and the secondary VM.

BRIEF DESCRIPTION OF THE DRAWINGS

FIGS. 1A-1D are diagrams of an overview of an example implementation described herein;

FIG. 5 is a flow chart of an example process for performing a managed reboot of a network device.

DETAILED DESCRIPTION

Figure 1B:
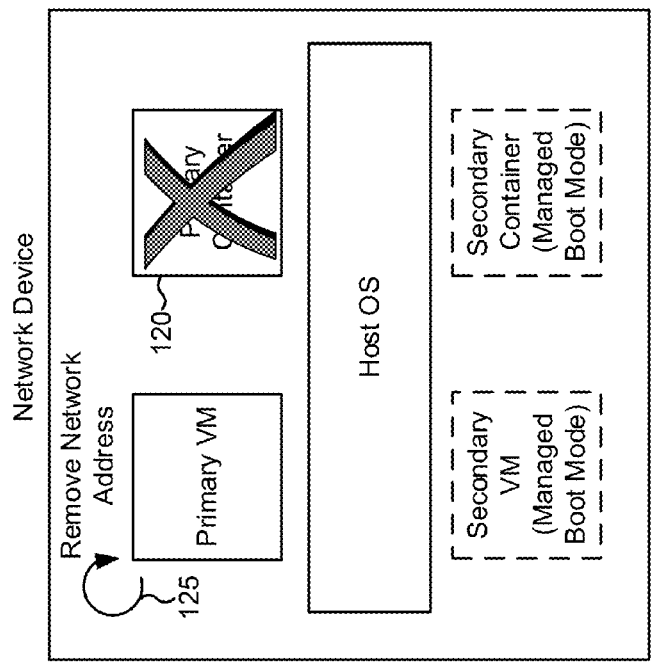

The following detailed description of example implementations refers to the accompanying drawings. The same reference numbers in different drawings may identify the same or similar elements.

A network device, such as a top-of-rack (TOR) switch or an end-of-rack (EOR) switch, may provide a network service (e.g., a packet forwarding service, a security service, a firewall service, etc.), through use of a virtual machine (VM) and a container. For example, a host OS of the network device may host a VM that acts as a control plane associated with the network service, and may host a container that acts as a data plane associated with the network service.

However, the VM and/or the container hosted by the network device may need to be rebooted at a particular time, such as based on a request from a user, due to a hardware failure, due to a software failure, or the like. As such, the network service may not be available for the duration of the reboot (e.g., from shut-down to complete restart of the VM and the container), resulting in the network service being unavailable for an amount of time, which may negatively impact a performance of the network device and/or a network associated with the network device.

Implementations described herein may provide a managed reboot, associated with a network service provided by a network device, that increases availability of the network service (e.g., as compared to a traditional reboot). In other words, the managed reboot may reduce an amount of time during which the network service is unavailable due to the reboot. In some implementations, the managed reboot may be performed based on creating a secondary VM and a secondary container on a host OS of the network device (in addition to a primary VM and a primary container associated with the network service).

FIGS. 1A-1D are diagrams of an overview of an example implementation 100 described herein. For the purposes of example implementation 100, assume that a host OS of a network device supports a primary VM that acts as a control plane associated with a network service provided by the network device, and a container that acts as a data plane associated with the network service provided by the network device.

As shown in FIG. 1A, and by reference number 105, the network device may receive an indication to perform a managed reboot of the network service. For example, the network device may receive the indication based on detecting a failure associated with the network service (e.g., a hardware failure, a software failure, etc.), user input indicating that the network device is to perform a managed reboot of the network service, an expiration of a timer related to scheduled, managed reboot of the network service, or the like.

As shown by reference number 110, the network device may create, based on receiving the indication and on the host OS, a secondary VM with a managed boot mode enabled. Similarly, as shown by reference number 115, the network device may create, a secondary container with the managed boot mode enabled. The managed boot mode may include a mode that, while enabled on a component of the network device (e.g., the secondary VM, the secondary container, etc.), prevents the component from interacting with another component of the network device. For example, the managed boot mode, when enabled on the secondary VM, may prevent the secondary VM from communicating with the primary container and the secondary container. As another example, the managed boot mode, when enabled on the secondary container, may prevent the secondary container from communicating with the primary VM and the secondary VM. In some implementations, the managed boot mode may be enabled to allow the network device to create the secondary VM and the secondary container without interfering with the network service provided by the primary VM and the primary container.

As shown in FIG. 1B, and by reference number 120, the network device may shut down the primary container after the network device creates the secondary VM and the secondary container. At this point, control plane traffic may not be forwarded to the primary VM (e.g., since the control plane traffic is forwarded to the primary VM by the primary container). However, data plane traffic may still be forwarded by the network device. A time at which the network device shuts down the primary container may be referred to herein as a control plane traffic stop time.

As shown by reference number 125, the network device may remove a network address (e.g., an Internet protocol (IP) address, a media access control (MAC) address, etc.) from the primary VM after the network device shuts down the primary container. In some implementations, the network device may remove the network address from the primary VM in order to prevent the secondary container from communicating with the primary VM (e.g., after the managed boot mode is disabled on the secondary container, as described below).

Figure 1C:
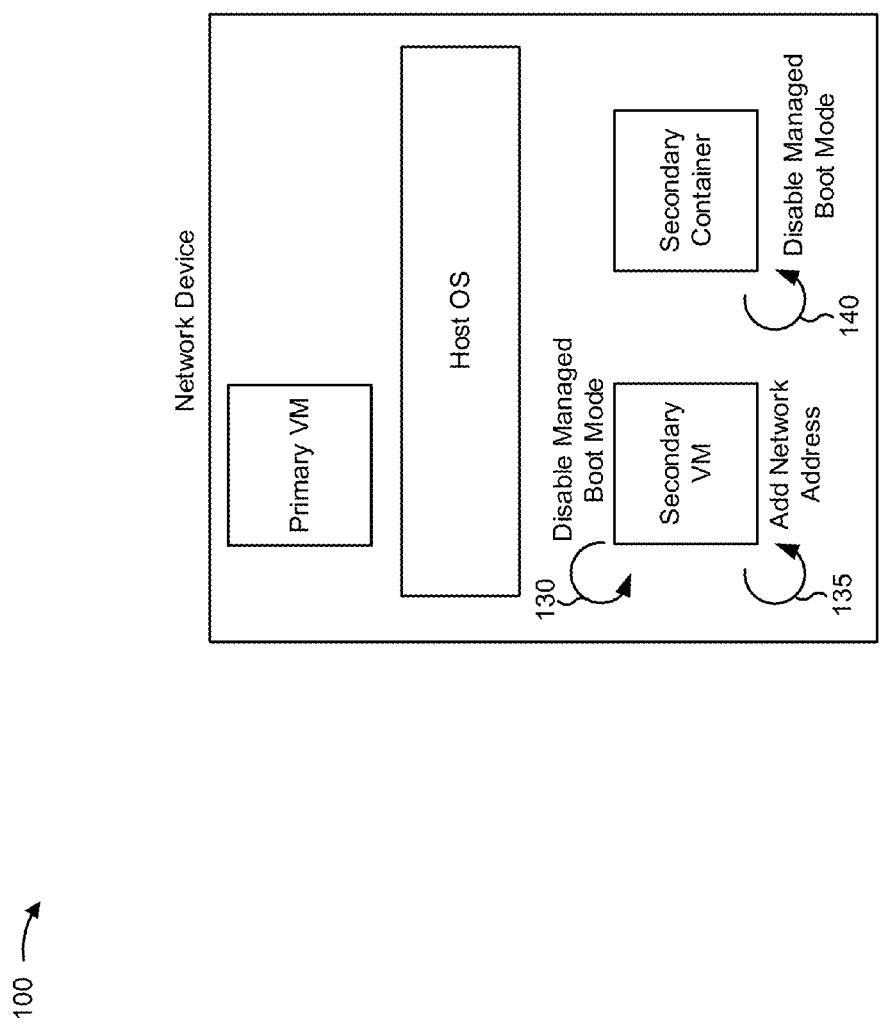

As shown in FIG. 1C, and by reference number 130, the network device may disable the managed boot mode on the secondary VM and, as shown by reference number 135, may assign the network address to the secondary VM. In some implementations, the network device may assign the network address to the secondary VM to allow the secondary container to communicate with the secondary VM in order to restart the network service, as described below. As shown by reference number 140, the network device may disable the managed boot mode on the secondary container. In some implementations, the network device may disable the managed boot mode on the secondary container to allow the secondary container to communicate with the secondary VM in order to restart the network service, as described below.

Figure 1D:
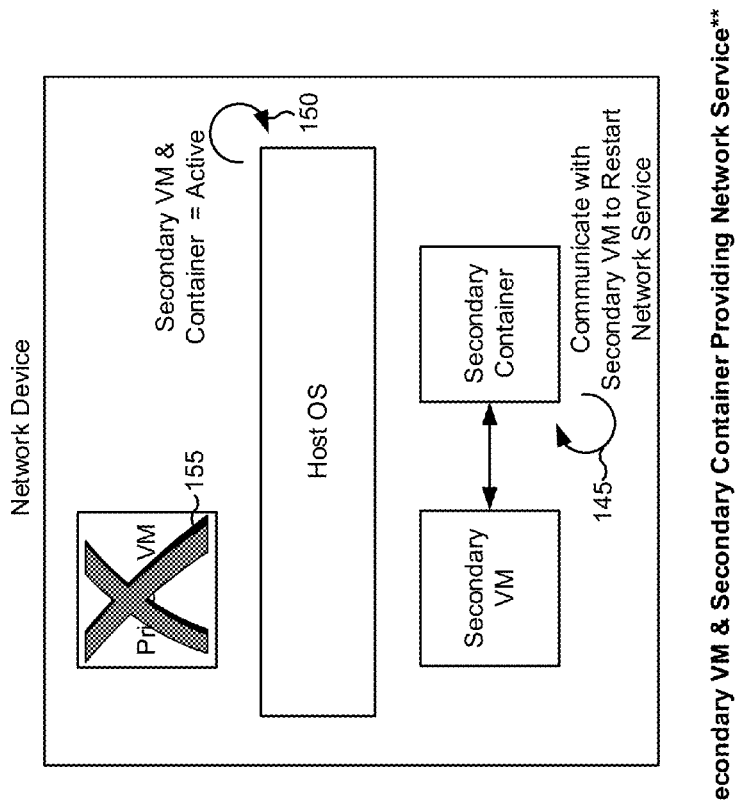

As shown in FIG. 1D, and by reference number 145, the secondary container may communicate with the secondary VM in order to perform steps associated with reinitializing hardware of the network device associated with providing the network service. In some implementations, when the secondary container begins the hardware initialization, the network device may stop forwarding data plane traffic. A time at which the network device stops forwarding the data plane traffic may be referred to herein as a data plane traffic stop time.

After initialization of the hardware is complete, the secondary VM and the secondary container may resume provisioning of the network service. A time at which the network device is ready to forward the data plane traffic and the control plane traffic may be referred to herein as a network service restart time.

As shown by reference number 150, the host OS may store information indicating that the secondary VM and the secondary contain are active (i.e., that the network service is being provided by the secondary VM and the secondary container). As shown by reference number 155, the network device may shut down the primary VM.

In some implementations, an amount of time between the control plane traffic stop time and the network service restart time (e.g., an amount time that control plane traffic is not forwarded) may be less than a corresponding amount of time associated with a traditional reboot (e.g., a reboot that includes shutting down and restarting the primary VM and the primary container for provisioning of the network service). Additionally, or alternatively, an amount of time between the data plane traffic stop time and the network service restart time (e.g., an amount of time that data plane traffic is not forwarded) may be less than a corresponding amount of time associated with the traditional reboot.

In this way, a network device may perform a managed reboot for a network service provided by the network device. The managed reboot may increase availability of the network service (e.g., as compared to a traditional reboot). In other words, the managed reboot may reduce an amount of time during which the network service is unavailable.

Figure 2:
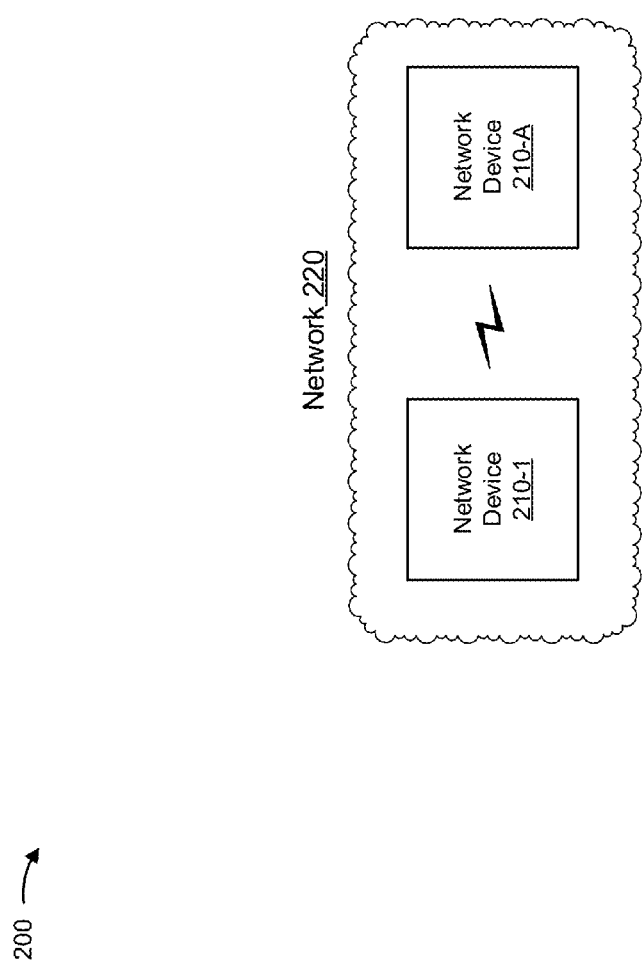
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-A (A≥1) (hereinafter referred to collectively as network devices 210, and individually as network device 210), and a network 220. Devices of environment 200 may interconnect via wired connections, wireless connections, or a combination of wired and wireless connections.

Network device 210 may include a device (e.g., a traffic transfer device) capable of providing a network service and/or transferring traffic between network devices 210 and/or other devices associated with network 220. For example, network device 210 may include a switch (e.g., a TOR switch, and EOR switch, etc.), a router, a gateway, a hub, a bridge, a firewall, a reverse proxy, a server (e.g., a proxy server), a security device, an intrusion detection device, or a similar device. In some implementations, network device 210 may be a standalone device, such as a device with a single processor, a device that is not chassis-based, or the like. In some implementations, the processor may include a device (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, the processor may include one or more processors capable of being programmed to perform a function.

In some implementations, network device 210 may execute a host OS that is capable of creating, managing, and/or operating one or more VMs and one or more containers in order to provide the network service. In some implementations, network device 210 may be capable of providing one or more network services. Additional details regarding network device 210 are provided below.

Network 220 may include one or more wired and/or wireless networks that include network devices 210 and/or allow network devices 210 to communicate. For example, network 220 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a private network, a cloud computing network, and/or a combination of these or other types of networks.

In some implementations, network devices 210 may be network devices of a data center and network 220 may be a communications network for the data center.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
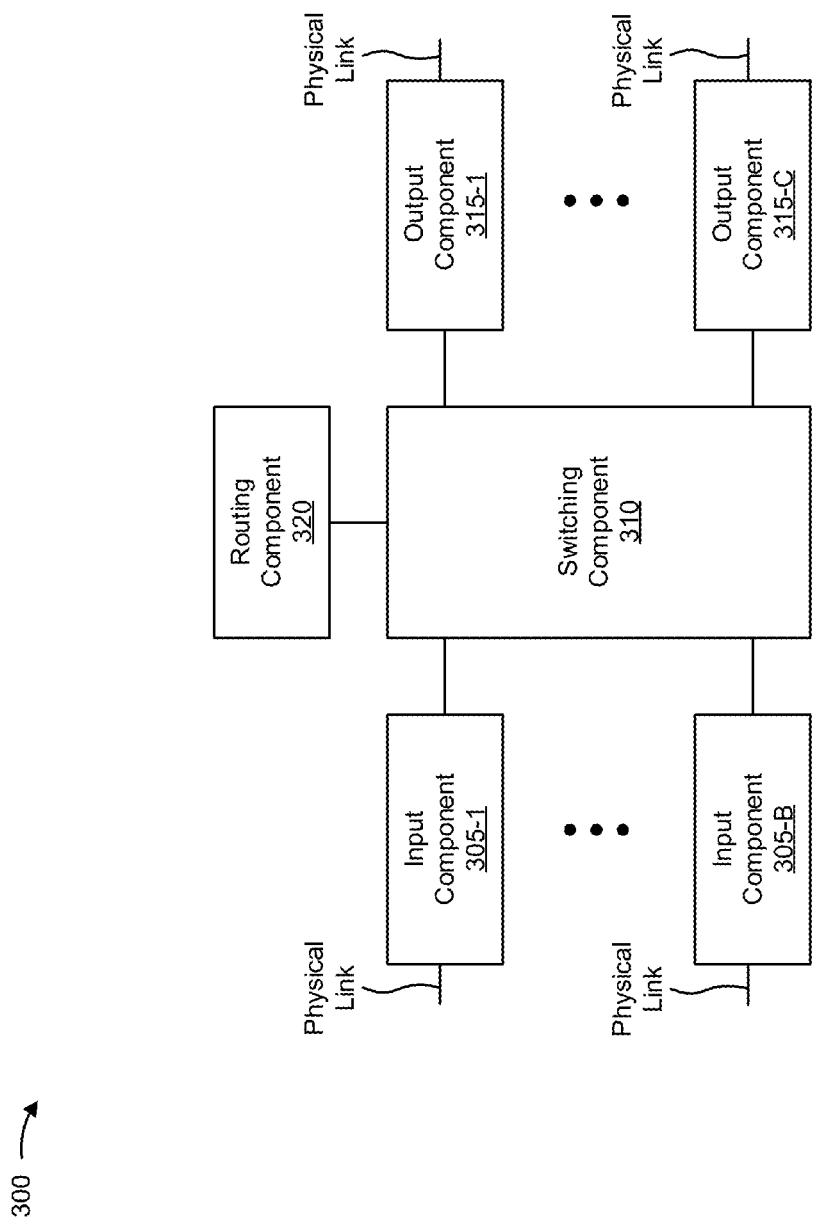
FIG. 3 is a diagram of example components of a network device of FIG. 2.

FIG. 3 is a diagram of example components of a device 300. Device 300 may correspond to network device 210. In some implementations, network device 210 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a routing component 320.

Input component 305 may include points of attachment for physical links and may be points of entry for traffic, such as packets. Input component 305 may process received traffic, such as by performing data link layer encapsulation or decapsulation. In some implementations, input component 305 may send packets to output component 315 via switching component 310.

Switching component 310 may interconnect input components 305 with output components 315. Switching component 310 may be implemented using one or more of multiple, different techniques. For example, switching component 310 may be implemented via busses, via crossbars, and/or with shared memories. The shared memories may act as temporary buffers to store traffic from input components 305 before the traffic is eventually scheduled for delivery to output components 315. In some implementations, switching component 310 may enable input components 305, output components 315, and/or routing component 320 to communicate.

Output component 315 may include points of attachment for physical links and may be points of exit for traffic, such as packets. Output component 315 may store packets and may schedule packets for transmission on output physical links. Output component 315 may include scheduling algorithms that support priorities and guarantees. Output component 315 may support data link layer encapsulation or decapsulation, and/or a variety of higher-level protocols. In some implementations, output component 315 may send packets and/or receive packets.

Routing component 320 may include one or more processors, microprocessors, field-programmable gate arrays (FPGAs), application-specific integrated circuit (ASICs), or similar types of processing components. In some implementations, routing component 320 may communicate with other devices, networks, and/or systems connected to device 300 to exchange information regarding network topology. Routing component 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming packets.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
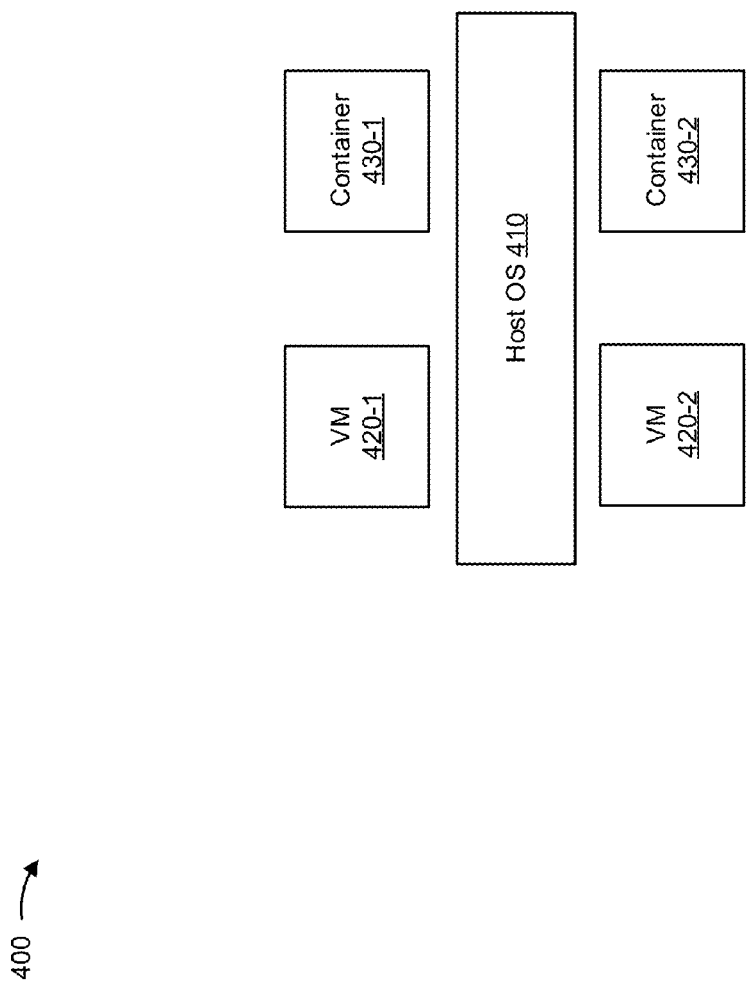
FIG. 4 is a diagram of example functional components of a network device shown in FIG. 2.

FIG. 4 is a diagram of example functional components of network device 210 of FIG. 2. As shown in FIG. 4, network device 210 may include a host OS 410, a primary VM 420 (e.g., VM 420-1), a secondary VM 420 (e.g., VM 420-2), a primary container 430 (e.g., container 430-1), and a secondary container 430 (e.g., container 430-2).

In some implementations, host OS 410, primary VM 420-1, secondary VM 420-2, primary container 430-1, and second container 430-2 may be implemented using one or more processors, microprocessors, FPGAs, ASICs, or the like of network device 210. In some implementations, host OS 410, primary VM 420-1, secondary VM 420-2, primary container 430-1, and second container 430-2 may be implemented in routing component 320. In some implementations, at least one of host OS 410, primary VM 420-1, secondary VM 420-2, primary container 430-1, or second container 430-2 may be implemented in routing component 320, and/or at least one of host OS 410, primary VM 420-1, secondary VM 420-2, primary container 430-1, or second container 430-2 may be implemented in input component 305, switching component 310, and/or output component 315.

Host OS 410 may include an OS associated with network device 210. For example, host OS 410 may include a Linux OS, or another type of OS that provides virtualization capability. In some implementations, host OS 410 may support VMs 420 and containers 430 associated with providing a network service. Additionally, or alternatively, host OS 410 may be capable of creating, operating, managing, or the like, the supported VMs 420 and/or containers 430.

VM 420 (e.g., primary VM 420, secondary VM 420) may include a virtual device capable of performing functions associated with a network service provided by network device 210. For example, VM 420 may include a VM configured to act as a control plane associated with the network service. In some implementations, VM 420 may be created, supported, operated, managed, or the like, by host OS 410. In some implementations, VM 420 may communicate with one or more other functional components of network device 210, such as container 430, in order to provide the network service. In some implementations, multiple VMs 420 may operate concurrently on host OS 410. For example, primary VM 420 and secondary VM 420 may operate concurrently on host OS 410 in order to allow a managed reboot to be performed, as described elsewhere.

Container 430 (e.g., primary container 430, secondary container 430) may include an isolated user-space instance capable of performing functions associated with a network service provided by network device 210. For example, container 430 may include a container configured to act as a data plane associated with the network service. In some implementations, container 430 may be created, supported, operated, managed, or the like, by host OS 410. In some implementations, container 430 may communicate with one or more other functional components of network device 210, such as VM 420, in order to provide the network service. In some implementations, multiple containers 430 may operate concurrently on host OS 410. For example, primary container 430 and secondary container 430 may operate concurrently on host OS 410 in order to allow a managed reboot to be performed, as described elsewhere. In some implementations, multiple containers 430 may communicate with a single VM 420 in order to provide multiple network services.

The number and arrangement of functional components shown in FIG. 4 are provided as an example. In practice, network device 210 may include additional functional components, fewer functional components, different functional components, or differently arranged functional components than those shown in FIG. 4. Additionally, or alternatively, a set of functional components (e.g., one or more functional components) of network device 210 may perform one or more functions described as being performed by another set of functional components of network device 210.

FIG. 5 is a flow chart of an example process 500 for performing a managed reboot associated with a network service. In some implementations, one or more process blocks of FIG. 5 may be performed by network device 210. In some implementations, one or more process blocks of FIG. 5 may be performed by another device or a group of devices separate from or including network device 210, such as another device included in network 220. Notably, while example process 500 may be described in the context of a packet forwarding service as the network service provided by network device 210, example process 500 may apply to another type of network service that may be provided by network device 210, such as a security service, a firewall service, or the like.

As shown in FIG. 5, process 500 may include receiving an indication to perform a managed reboot associated with a network service provided by a primary VM and a primary container (block 505). For example, network device 210 may receive an indication to perform a managed reboot associated with a network service provided by primary VM 420 (e.g., VM 420-1) and primary container 430 (e.g., container 430-1). The managed reboot may include a reboot, performed by network device 210, that restarts provisioning of the network service while increasing availability of the network service as compared to a traditional reboot (i.e., by reducing an amount of time during which the network service is unavailable).

In some implementations, network device 210 may receive the indication based on a failure detected by network device 210. For example, network device 210 may detect a hardware failure, associated with the network service and/or network device 210, and/or a software failure associated with the network service and/or network device 210. Here, the detection of the hardware failure and/or the software failure may act as the indication to perform the managed reboot. In some implementations, network device 210 may be configured (e.g., as a default, based on user input, etc.) to perform the managed reboot based on detecting the hardware failure and/or the software failure (e.g., rather than a traditional reboot).

Additionally, or alternatively, network device 210 may receive the indication based on user input. For example, network device 210 may receive user input indicating that network device 210 is to perform the managed reboot. In some implementations, network device 210 may be configured (e.g., as a default, based on user input, etc.) to perform the managed reboot based on receiving the user input (e.g., rather than a traditional reboot).

Additionally, or alternatively, network device 210 may receive the indication based on a configuration of network device 210. For example, network device 210 may be configured to periodically (e.g., at 12:00 a.m. on a particular day of the week, once every 24 hours, etc.) perform the managed reboot.

As further shown in FIG. 5, process 500 may include creating, based on the indication, a secondary VM with a managed boot mode enabled, and a secondary container with the managed boot mode enabled (block 510). For example, network device 210 may create, based on receiving the indication, secondary VM 420 (e.g., VM 420-2) with a managed boot mode enabled, and secondary container 430 (e.g., container 430-2) with the managed boot mode enabled. In some implementations, network device 210 may create secondary VM 420 and secondary container 430 after network device 210 receives the indication to perform the managed reboot.

In some implementations, network device 210 may create secondary VM 420 with the managed boot mode enabled by starting up and/or activating secondary VM 420 and then configuring secondary VM 420 to be in the managed boot mode. Similarly, in some implementations, network device 210 may create secondary container 430 with the managed boot mode enabled by starting up and/or activating secondary container 430 and then configuring secondary container 430 to be in the managed boot mode The managed boot mode may include a mode that, while enabled on a component of network device 210 (e.g., secondary VM 420, secondary container 430), prevents the component from interacting with another component of network device 210. For example, the managed boot mode, when enabled on secondary VM 420, may prevent secondary VM 420 from interacting with primary container 430 and secondary container 430. As another example, the managed boot mode, when enabled on secondary container 430, may prevent secondary container 430 from interacting with primary VM 420 and secondary VM 420. As such, by enabling the managed boot mode, network device 210 may create secondary VM 420 and secondary container 430 without interfering with the network service provided by primary VM 420 and primary container 430. In some implementations, secondary VM 420 and secondary container 430 may provide the network service after the managed reboot is completed, as described below.

As further shown in FIG. 5, process 500 may include shutting down the primary container (block 515). For example, network device 210 may shut down primary container 430. In some implementations, network device 210 may shut down primary container 430 when (e.g., before, after, concurrently with, etc.) network device 210 creates secondary VM 420 and secondary container 430.

In some implementations, network device 210 may stop forwarding control plane traffic after network device 210 shuts down primary container 430. For example, a component of primary container 430 (e.g., a packet forwarding component) may be responsible for forwarding control plane traffic to a component of primary VM 420 (e.g., a routing component). As such, when network device 210 shuts down primary container 430, network device 210 may stop forwarding the control plane traffic to primary VM 420.

However, data plane traffic may still be forwarded (e.g., switched) by network device 210, even though primary container 430 has been shut down. Here, hardware components of network device 210 may not be affected by the shutdown of primary container 430, and may continue forwarding traffic in accordance with configurations programmed on the hardware components at the time that primary container 430 is shut down. In other words, the data plane traffic may continue to be forwarded based on current programming of the hardware components of network device 210, but access to the hardware components to alter the programming is cut-off (e.g., since no control plane traffic is forwarded to primary VM 420 after the shutdown, since primary container 430 cannot program the hardware components after being shut down, etc.). In some implementations, a time at which network device 210 shuts down primary container 430 may be referred to as a control plane traffic stop time.

As further shown in FIG. 5, process 500 may include removing a network address from the primary VM (block 520). For example, network device 210 may remove a network address from primary VM 420. In some implementations, network device 210 may remove the network address from primary VM 420 after network device 210 shuts down primary container 430.

In some implementations, the network address may include a network address that allows container 430 (e.g., primary container 430, secondary container 430) to communicate with VM 420 (e.g., primary VM 420, secondary VM 420), such as an IP address or a MAC address associated with a routing component of VM 420. For example, the packet forwarding component of container 430 may forward control plane traffic to VM 420 using the IP address.

In some implementations, network device 210 may remove the network address from primary VM 420 before network device 210 adds the network address to secondary VM 420, as described below. For example, the network address may include a well-known network address that may be used by a container (e.g., primary container 430, secondary container 430, etc.) to communicate with a VM (e.g., primary VM 420, secondary VM 420). Here, network device 210 may delete an association between primary VM 420 and the network address such that primary VM 420 is no longer associated with the network address. Network device 210 may remove the network address from primary VM 420 in order to prevent secondary container 430 from communicating with primary VM 420 after network device 210 disables the managed boot mode on secondary container 430, as described below.

As further shown in FIG. 5, process 500 may include disabling the managed boot mode on the secondary VM and assigning the network address to the secondary VM (block 525). For example, network device 210 may disable the managed boot mode on secondary VM 420 (e.g., by configuring secondary VM 420 to cause secondary VM 420 to exit the managed boot mode) and assign the network address to secondary VM 420. In some implementations, network device 210 may disable the managed boot mode on secondary VM 420 and assign the network address to secondary VM 420 after network device 210 removes the network address from primary VM 420.

In some implementations, network device 210 may disable the managed boot mode on secondary VM 420 and assign the network address to the secondary VM 420 to allow secondary VM 420 to communicate with secondary container 430 (e.g., after the managed boot mode is disabled on secondary container 430, as described below). For example, as described above, the network address may include a well-known network address. Here, network device 210 may create an association between secondary VM 420 and the well-known network address such that secondary container 430 may communicate with secondary VM 420 using the well-known network address (e.g., when secondary container 430 is configured to communicate using the well-known network address). In other words, network device 210 may disable the managed boot mode and assign the network address to secondary VM 420 in order to prepare secondary VM 420 to provide the network service (e.g., rather than primary VM 420) after communicating with secondary container 430 to restart the network service.

As further shown in FIG. 5, process 500 may include disabling the managed boot mode on the secondary container to cause the secondary container to communicate with the secondary VM and restart the network service (block 530). For example, network device 210 may disable the managed boot mode on secondary container 430 to cause secondary container 430 to communicate with secondary VM 420 and restart the network service. In some implementations, network device 210 may disable the managed boot mode on secondary container 430 after network device 210 disables the managed boot mode on secondary VM 420. Additionally, or alternatively, network device 210 may disable the managed boot mode on secondary container 430 after network device 210 adds the network address to secondary VM 420.

In some implementations, network device 210 may disable the managed boot mode on secondary container 430 by configuring secondary container 430 to cause secondary container 430 to exit the managed boot mode, which may cause secondary container 430 to establish communication with secondary VM 420. For example, as described above, the network address may include a well-known network address. Here, secondary container 430 may be configured to attempt (e.g., periodically) to communicate using the well-known network address. In this example, when the managed boot mode is disabled on secondary container 430, secondary container 430 may communicate with secondary VM 420 using the well-known network address (e.g., on a next attempt to communicate using the well-known network address).

In some implementations, disabling the managed boot mode on secondary container 430 may cause secondary container 430 to communicate with secondary VM 420 and restart the network service. For example, upon disabling the managed boot mode, secondary container 430 may (e.g., automatically) communicate with secondary VM 420 in order to perform steps associated with reinitializing a hardware component of network device 210 associated with providing the network service. As an example, secondary container 430 may communicate with secondary VM 420 to initiate an optics scan associated with network device 210, complete synchronization of software states from secondary VM 420 to secondary container 430, and perform hardware initialization associated with network device 210. In some implementations, when secondary container 430 begins the hardware initialization, network device 210 may stop forwarding data plane traffic. In some implementations, a time at which network device 210 stops forwarding the data plane traffic may be referred to as a data plane traffic stop time. As such, when secondary container 430 begins initialization of the hardware, network device 210 may not be capable of forwarding data plane traffic or control plane traffic associated with the network service.

After initialization of the hardware is complete (e.g., after the hardware component is reprogrammed), network device 210 (e.g., secondary VM 420 and secondary container 430) may be ready to forward the data plane traffic and the control plane traffic. In other words, secondary VM 420 and secondary container 430 may resume provisioning of the network service after initialization of the hardware component is complete. In some implementations, a time at which network device 210 is ready to forward the data plane traffic and the control plane traffic (e.g., after hardware initialization) may be referred to as a network service restart time.

In this way, network device 210 may perform the managed reboot associated with the network service. In some implementations, an amount of time between the control plane traffic stop time and the data plane traffic stop time may be less than or equal to approximately 90 seconds. Additionally, or alternatively, an amount of time between the data plane traffic stop time and the network service restart time may be less than or equal to approximately 25 seconds. Additionally, or alternatively, an amount of time between the control plane traffic stop time and the network service restart time may be less than or equal to approximately 115 seconds.

In some implementations, host OS 410 may store information indicating that secondary VM 420 is active (e.g., rather than primary VM 420) based on secondary VM 420 and secondary container 430 resuming the network service. In some implementations, host OS 410 may store the information indicating that secondary VM 420 is active in order to allow host OS 410 to monitor secondary VM 420 and/or restart secondary VM 420 (e.g., rather than primary VM 420) when, for example, network device 210 powers-on (e.g., after being powered off). In other words, after secondary VM 420 and secondary container 430 resume the network service, secondary VM 420 may be marked as active in order to indicate that secondary VM 420 is acting in a primary capacity (e.g., since the existing or current primary VM 420 may not be operating on host OS 410 after completion of process 500, secondary VM 420 may become primary VM 420). In some implementations, host OS 410 may store information indicating that secondary container 430 is active (e.g., rather than primary container 430) in a similar manner.

As further shown in FIG. 5, process 500 may include shutting down the primary VM (block 535). For example, network device 210 may shut down primary VM 420. In some implementations, network device 210 may shut down primary VM 420 after network device 210 disables the managed boot mode on secondary container 430. Additionally, or alternatively, network device 210 may shut down primary VM 420 after the network service is restarted.

In some implementations, process 500 may be repeated (e.g., based on receiving another indication to perform a managed reboot at a later time). For example, as described above, secondary VM 420 and secondary container 430 may assume the role of primary VM 420 and primary container 430 after process 500 is completed. In this example, network device 210 may receive another indication to perform a manage reboot, and process 500 may be repeated (e.g., by creating a new secondary VM 420 and a new secondary container 430).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein may provide a managed reboot, associated with a network service provided by a network device, that increases availability of the network service (e.g., as compared to a traditional reboot). In other words, the managed reboot may reduce an amount of time during which the network service is unavailable due to the reboot.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device, an indication to perform a reboot associated with a network service,
        the network service being provided by a first virtual machine (VM) associated with the device and a first container associated with the device;
    creating, by the device and based on receiving the indication, a second VM with a boot mode enabled and a second container with the boot mode enabled,
        the boot mode, while enabled, preventing the second VM and the second container from communicating with the first container and the first VM, respectively, and
        the boot mode being enabled without interfering with the network service provided by the first VM and the first container;
    shutting down, by the device, the first container,
        the first container being shut down based on creating the second VM and the second container;
    removing, by the device and after shutting down the first container, a network address from the first VM;
    disabling, by the device and based on removing the network address from the first VM, the boot mode on the second VM and assigning the network address to the second VM;
    disabling, by the device and based on disabling the boot mode on the second VM, the boot mode on the second container,
        the boot mode being disabled on the second container to cause the network service to be provided by the second container and the second VM; and
    shutting down, by the device and based on disabling the boot mode on the second container, the first VM.

2. The method of claim 1, further comprising:
    storing information indicating that the second VM is providing the network service,
        the information being stored based on disabling the boot mode on the second container.

3. The method of claim 1, comprising:
    detecting a failure associated with the network service; and
    where receiving the indication comprises:
        receiving the indication based on detecting the failure associated with the network service.

4. The method of claim 1, further comprising:
    reinitializing hardware, associated with the device, based on disabling the boot mode on the second container,
        the hardware being reinitialized in order to allow the second container and the second VM to provide the network service.

5. The method of claim 1, where the second VM functions in a control plane associated with the network service or the second container functions in a data plane associated with the network service.

6. The method of claim 1, further comprising:
    receiving user input associated with performing the reboot; and
    where receiving the indication comprises:
        receiving the indication based on the user input.

7. The method of claim 1, where the network service is at least one of:
    packet forwarding service,
    a security service, or
    a firewall service.

8. A network device, comprising:
    a processor to:
        receive an indication to perform a reboot associated with a network service,
            the network service being provided via a first virtual machine (VM) of the network device and a first container of the network device;
        create, based on receiving the indication, a second VM and a second container,
            the second VM being created with a boot mode enabled,
                the boot mode, while enabled on the second VM, preventing the second VM from communicating with the first container,
            the second container being created with the boot mode enabled,
                the boot mode, while enabled on the second container, preventing
                the second container from communicating with the first VM, and
            the boot mode being enabled without interfering with the network service provided by the first VM and the first container;
        shut down the first container based on creating the second VM and the second container;
        remove, after shutting down the first container, a network address from the first VM;
        disable, after removing the network address from the first VM, the boot mode on the second VM and assign the network address to the second VM;
        disable, after disabling the boot mode on the second VM, the boot mode on the second container;
        cause the network service to be provided by the second container and the second VM based on disabling the boot mode on the second VM; and
        shut down, after disabling the boot mode on the second container, the first VM.

9. The network device of claim 8, where the processor is further to:
    store information indicating that the second container is providing the network service,
        the information being stored based on disabling the boot mode on the second container.

10. The network device of claim 8, where the processor is to:
    receive user input associated with performing the reboot; and
    receive the indication based on the user input.

11. The network device of claim 8, where the processor is further to:
    reinitialize an integrated circuit of the network device based on disabling the boot mode on the second container,
        the integrated circuit being reinitialized in order to allow the second container and the second VM to provide the network service.

12. The network device of claim 8, where the network service is a packet forwarding service, a security service, or a firewall service.

13. The network device of claim 8, where the second VM functions in a control plane associated with the network service.

14. The network device of claim 8, where the second container functions in a data plane associated with the network service.

15. A non-transitory computer-readable medium storing instructions, the instructions comprising:

one or more instructions that, when executed by a network device, cause the network device to:
  receive an indication to perform a reboot associated with a network service,
    the network service being provided by a primary virtual machine (VM) of the network device and a primary container of the network device;
  create, based on receiving the indication, a secondary VM with a managed boot mode enabled and a secondary container with the managed boot mode enabled,
    the managed boot mode, while enabled on the secondary VM and the secondary container, preventing the secondary VM and the secondary container from communicating with the primary container and the primary VM, and
    the managed boot mode being enabled without interfering with the network service provided by the primary VM and the primary container;
  shut down the primary container based on creating the secondary VM and the secondary container;
  remove, based on shutting down the primary container, a network address from the primary VM;
  assign, based on shutting down the primary container, a network address of the primary VM to the secondary VM;
  disable, based on removing the network address from the primary VM, the managed boot mode on the secondary VM;
  disable, based on assigning the network address to the secondary VM, the managed boot mode on the secondary container,
    the managed boot mode being disabled on the secondary container to cause the network service to be provided by the secondary container and the secondary VM; and
  shut down, based on disabling the managed boot mode on the secondary container, the primary VM.

16. The non-transitory computer-readable medium of claim 15, where the one or more instructions, when executed by the network device, further cause the network device to:
  store information indicating that the secondary VM and the secondary container are providing the network service,
    the information being stored based on disabling the managed boot mode on the secondary container.

17. The non-transitory computer-readable medium of claim 15, where the one or more instructions, when executed by the network device, further cause the network device to:
  receive user input associated with performing the reboot; and
  receive the indication based on the user input.

18. The non-transitory computer-readable medium of claim 15, where the one or more instructions, when executed by the network device, further cause the network device to:
  reinitialize a hardware component based on disabling the managed boot mode on the secondary container,
    the hardware component being reinitialized in order to allow the secondary container and the secondary VM to provide the network service.

19. The non-transitory computer-readable medium of claim 15, where the secondary VM functions in a control plane associated with the network service or the secondary container functions in a data plane associated with the network service.

20. The non-transitory computer-readable medium of claim 15, where the one or more instructions, when executed by the network device, further cause the network device to:
  detect a failure associated with the network service; and
  where the one or more instructions, that cause the network device to receive the indication, cause the network device to:
    receive the indication based on detecting the failure associated with the network service.

* * * * *